United States Patent [19]

de Graaf

[11] 4,422,071
[45] Dec. 20, 1983

[54] PAGING RECEIVER

[75] Inventor: Nicolaas R. de Graaf, Emmen, Netherlands

[73] Assignee: Nira International B.V., Emen, Netherlands

[21] Appl. No.: 228,473

[22] Filed: Jan. 26, 1981

[30] Foreign Application Priority Data

Jan. 30, 1980 [NL] Netherlands .......................... 8000578

[51] Int. Cl.³ .................................................. G08B 5/22
[52] U.S. Cl. ............................. 340/825.44; 340/825.5; 340/825.15; 340/825.22
[58] Field of Search ....................... 340/825.44, 825.47, 340/825.48, 311.1, 825.69, 825.72, 825.75, 825.76, 825.5, 825.52, 825.15, 825.22; 455/31, 38, 228

[56] References Cited

U.S. PATENT DOCUMENTS

| 3,976,995 | 8/1976 | Sebestyen | 340/825.44 |
| 4,037,201 | 7/1977 | Willmott | 340/825.44 |
| 4,114,142 | 9/1978 | Wycoff et al. | 340/825.44 |
| 4,145,684 | 3/1979 | Stodolski | 340/825.48 |
| 4,263,480 | 4/1981 | Levine | 340/825.44 |

OTHER PUBLICATIONS 2,016,768 A, Poliakoff, Sep. 26, 1979, 340-825.44.

Primary Examiner—Donnie L. Crosland
Attorney, Agent, or Firm—Silverman, Cass & Singer, Ltd.

[57] ABSTRACT

Paging receiver including a memory for a predetermined address code, a comparator to determine the equality between this address code and a received address code and a message coding device cooperating with a display to represent a received message code, the memory being free-programmable from the exterior to store therein at least one desired selectable address code which may be represented on the display.

6 Claims, 1 Drawing Figure

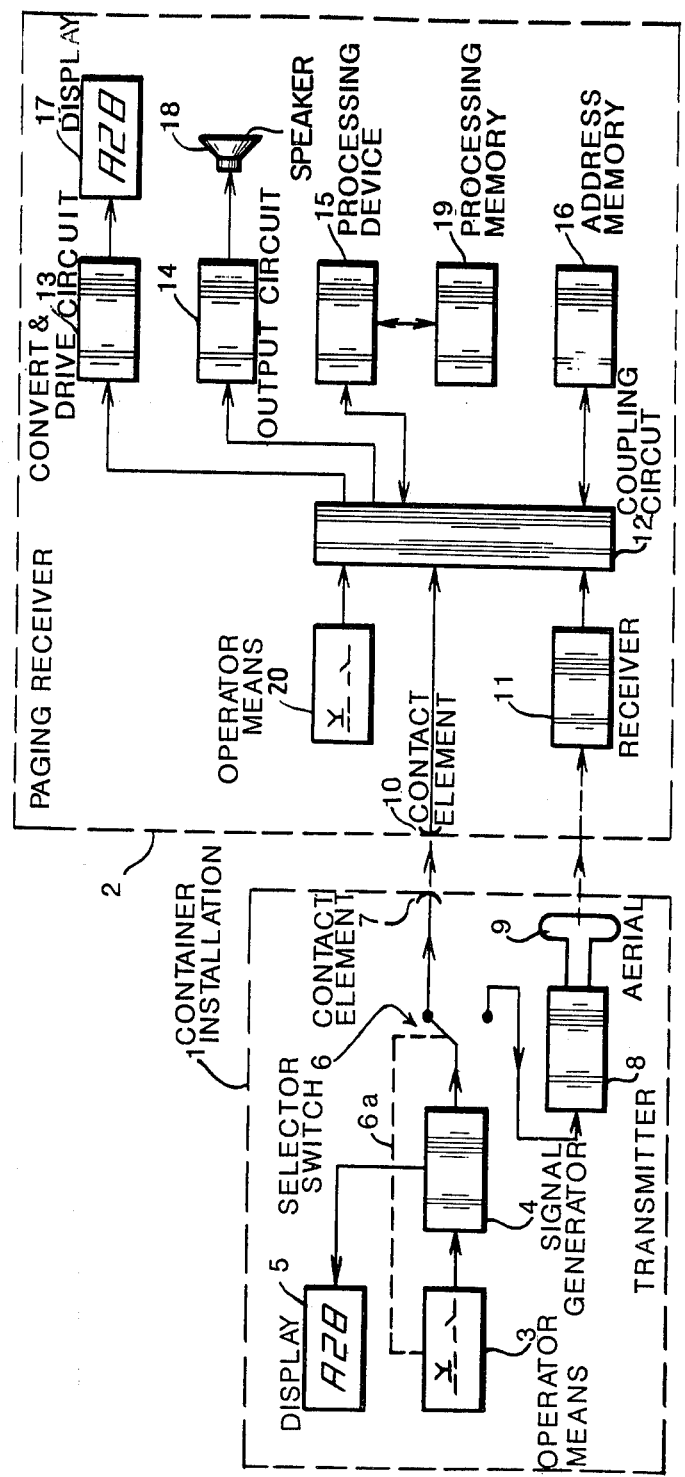

PAGING RECEIVER

BACKGROUND OF THE INVENTION

1. Field of the Invention

The present invention relates to a paging receiver comprising a memory device in which a predetermined address code may be stored, a comparator to determine the equality between this address code and a received address code and a message coding device cooperating with a display to represent a received message code.

2. Description of the Prior Art

In the prior art generally a number of such paging receivers are combined in a complete installation or network with each of the users being given a predetermined identification number that is known to the exchange and that in case of calling is emitted in coded form. The proper receiver having this identification number reacts on reception of this characterizing signal by emitting an optic or acoustic attention signal or, in a noisy environment or in case of a so-called "discrete call", with a vibrator signal by which the attention of the user is drawn to the presence of a call.

Furthermore modern paging receivers comprise a display on which, mostly in coded form, the message for the user is represented.

In practice such paging receivers and installations comprising such receivers have a number of disadvantages. If a certain receiver fails, the user obtains a new receiver which usually is a spare taken from stock, and thus also gets a new address code; the exchange operator has to be informed about the change and if persons inside the building must have direct access to the exchange, all persons concerned have to be informed about the temporary change. It is difficult to change the address code and thus it is also very cumbersome, if not impossible, to let individual address codes correspond with for instance a changed room arrangement in a building or to relate them in a simple manner to internal telephone numbers.

In one embodiment of a known paging receiver, as described in British Patent specification No. 2,016,768, the receiver's individual address is stored in an address module in the form of a read-only memory. This embodiment has the disadvantage that, in order to change the address of a receiver, one has to exchange physical parts. To that extent all receivers must be able to receive such parts, so that using receivers of a later generation may not always be possible. Furthermore, exchanging such physical parts may lead to bad electric connections and thus to malfunction of the receiver concerned.

SUMMARY OF THE INVENTION

According to the invention a paging receiver is provided by which the drawbacks of the prior art are solved and by which the possibilities of use of a complete installation comprising a number of such receivers, is significantly braddened and made more flexible.

It is therefore an object of the present invention to provide such a receiver wherein the device, in which the address code is stored, is formed by a memory which is freely programmable from the exterior to store therein at least one desired selectable address code which may be represented on the display.

It is another object of the invention to provide a receiver in which the memory device is a non-volatile freely programmable memory. One commercially available type of such a memory is known as the so-called EAROM, of which the memory contents are to be modified only by means of electric signals. This has the advantage that the memory will not loose its contents and need not be programmed anew in case of a too low supply voltage, e.g. due to an excessive discharge, or exchange, of the batteries.

It is also an object of the invention to provide a receiver in which the memory device is a freely programmable memory and comprising galvanic connection means with an exterior memory programming device.

It is still another object of the invention to provide a receiver in which the memory device is a freely programmable memory and comprising means to receive and process programming signals transmitted electromagnetically from a programming device to the receiver.

The address code, set in the memory by the programming device and the connection means or the means receiving the programming signals, will either or not permanently be represented on the display and thus one can always check if the receiver, which one possesses, is set on the right address code. If not, reprogramming is a simple matter.

It is furthermore an object of the invention to provide a container installation for accomodating a number of receivers according to the invention and comprising means for converting a desired address code into a binary code and means for selectively transferring this address code to the freely programmable address memory of a selected paging receiver.

Moreover it is an object of the invention to provide such a container installation comprising a display for representing the address emitted to a selected receiver.

The operation of such a container installation, which of course will be a part of the paging exchange, is very simple; by means of a keyboard the exchange operator keys the new desired address code to which the paging receiver is to be set, which address code may be represented on a separate display and in the meantime may be transferred to the receiver; on the display thereof one can check whether the address code is received and processed properly.

The features of the present invention which are believed to be novel are set forth with particularity in the appended claims.

Other claims and many of the attendant advantages will be more readily appreciated as the same becomes better understood by reference to the following detailed description and considered in connection with the accompanying drawing.

DESCRIPTION OF THE DRAWING

The drawing shows a container installation 1 and a paging receiver 2 which are shown separated from each other by means of dotted lines.

DESCRIPTION OF A PREFERRED EMBODIMENT

The container installation 1 has operator means 3, which may be part of the paging exchange and from which the data concerning a new address is set to a signal generator 4 and where the data, being converted into a suitable form, is transferred to a display 5. Furthermore this data is sent, possibly converted into another form, via fixed connection to a contact element 7 or via a transmitter 8 to a transmitting aerial 9, or if both the contact element 7 and the transmitter 8 with the transmitting aerial 9 are used, via a selector switch 6 connected with an output of the signal generator 4 to the contact element 7 or to the aerial 9.

The paging receiver 2 has a contact element 10, which, when the paging receiver 2 is placed in the container installation 1, makes a galvanic contact with the contact element 7 of the latter. It also comprises a receiver 11, which is capable of receiving address signals when the paging receiver 2 is in use as such and which also receives signals emittted by the aerial 9 during the programming of the paging receiver 2, when it is placed in the container installation 1. The contact element 10 and the output of the receiver 11 are connected to a coupling circuit 12, which outputs are connected with with inputs of a convert and drive circuit 13, an output circuit 14, a processing device or microprocessor 15 and an address memory 16. The coupling circuit 12 has also inputs which are connected with outputs of the processing device 15 and the address memory 16. The output of the convert and drive circuit 13 is connected with a display 17, while the output of the output circuit 14 is connected with for instance an acoustic or optic signalling device or with a speaker 18, and inputs and outputs of the processing device 15 are connected with inputs and outputs of a processing memory 19. The coupling circuit 12 is also connected with an operator means 20, which means may consist of a number of keys and/or switches. In a practical embodiment divers circuits, schematically indicated by blocks in the drawing, especially the ones with references 12, 13, 14, 15, 16 and 19, may be configured in a single integrated circuit.

According to known techniques the connections between the coupling circuit 12 and the processing device 15, between the coupling circuit 12 and the address memory 16 and between the processing device 15 and the processing memory 19 may be used in both directions, while corresponding inputs and outputs of divers circuits may be formed by the same terminals.

Although the drawing shows the connections as being single, they may comprise a bundle of connection lines. This is not so for the non-galvanic connection between the transmitting aerial 9 and the receiver 11 and in most cases also not between the output circuit 14 and the signal producer 18. Dependent on the number of concerned connection lines the switch 6 is constructed in multiple form and this will require more mutual cooperating contacts 7 and 10.

If the container installation 1 is able to accomodate a number of paging receivers 2 simultaneously, the container installation 1 has the same number of contact groups 7, which are connected into parallel or, if so desired, separately connected with the output or outputs of the signal generator 4 by means of the switch 6, which is then modified accordingly.

The operation of the switch 6, if this switch is used, may take place from the operator means 3, which is illustrated by means of dotted line 6a.

The operation of the combination of the container installation 1 and the paging receiver 2 with respect to the programming thereof is as follows:

The paging receiver 2 is placed in the container installation 1, so that the contact elements 7 and 10 constitute a galvanic connection, or alternatively the receiver 11 can receive a signal, emitted by the transmitting aerial 9. Thereafter a new address for the paging receiver 2, which is just placed into the container installation, is input to the operator means 3, after which the signal generator 4 converts this data into a binary code preferably also enclosing check bits and an indication that the following code concerns an address to be programmed.

The code emitted by the signal generator 4 is fed into the coupling circuit 12 of the paging receiver 2 via the switch 6 if such is used and the contact elements 7 and 10 in a suitable signal form.

The code may also be transmitted to the coupling circuit 12 by means of the transmitter 8, which may convert the code into a message for the receiver 11, and via the transmitting aerial 9 and the receiver 11.

The processing device 15 will process the received code with respect to the validity thereof and afterwards as to the contents thereof and will represent the result of that, which may be an error-indication or the new address, on the display 17 by means of the coupling circuit 12 and the convert and drive circuit 13. During the processing of the received code the processing device 15 cooperates with the processing memory 19 in which is stored the program which is required for processing and which also provides the opportunity to store temporary results. If the received code concerns a new address for this paging receiver 2, the processing device 15 will store this in the address memory 16 through the coupling circuit 12. In order that the supply voltage cannot influence the contents of the address memory 16 this memory is preferably not only freely programmable, but also non-volatile.

When the paging receiver 2 is in use, the contents of the address memory 16 may be read-out by the coupling circuit 12, if necessary or wanted in cooperation with the processing device 15 for comparing an address code received by means of the receiver 11 with the address code present in the address memory 16. In case of equality an acoustic signal will be emitted by means of the output circuit 14 and the signal producer 18, which signal may be modulated dependent on the message.

Depending on the state of the operator means 20 or through these operator means and in dependence of the fact whether or not the paging receiver 2 is being programmed or receives its identifying address, the display 17 will present a new address just programmed, or an error indication, its (former) address or a message being in numerical or in alpha-numerical form.

If several addresses must be supplied to the paging receiver 2 the codes sent to this receiver 2 by the container installation 1 must include indications as to which old address in the, corresponding enlarged, address memory 16 has to be exchanged with the new address and further what priority has to be given to the new address.

The transmitter 8 may be a transmitter which is designed for programming only, having little output power, but can also be switched to a higher output power and thus may serve to program at short distances or to call a paging receiver 2 at a greater distance.

While there is shown and described a preferred embodiment of the invention, it will be apparent to those skilled in the art that many other changes and modifications may be made without departing from the invention in its broader aspects. It is therefore intended to have the appended claims cover all such changes and modifications as fall within the true spirit and scope of the invention.

What is claimed is:

1. A programmable paging receiver comprising: address memory means that are freely programmable from exterior of said receiver, for storing therein at least one desired programmable address code used to select that particular receiver; comparator means for comparing the programmed address code and a received address code, to determine whether that particular receiver is to be selected in response to the received address code; meas for receiving and processing programming signals for changing the stored address code; a display device; and message coding means cooperating with the display device to represent on the display device a received message code and an address code, whereby the address code used to select that particular receiver may be variably programmed, and the programmed address code verified on the display device.

2. The receiver of claim 1 wherein the address memory means are non-volatile.

3. The receiver of claim 1 further including contact means for receiving said programming signals for changing the stored address code.

4. The receiver of claim 1 wherein said receiving and processing means further includes means for receiving and processing electromagnetically transmitted programming signals.

5. A container installation accomodating a number of paging receivers as claimed in claim 1 including means for converting a desired address code into a binary code and means for selectively transferring this address code to the freely programmable address memory of a selected paging receiver.

6. The container installation of claim 5 further including a display for displaying the address transferred to a selected paging receiver.

* * * * *